(12) United States Patent
Zhang et al.

(10) Patent No.: US 9,225,023 B2
(45) Date of Patent: Dec. 29, 2015

(54) FULLERENES AS HIGH CAPACITY CATHODE MATERIALS FOR A RECHARGEABLE MAGNESIUM BATTERY

(71) Applicant: Toyota Motor Engineering & Manufacturing North America, Inc., Erlanger, KY (US)

(72) Inventors: Ruigang Zhang, Ann Arbor, MI (US); Fuminori Mizuno, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 165 days.

(21) Appl. No.: 14/045,906

(22) Filed: Oct. 4, 2013

(65) Prior Publication Data

US 2015/0099166 A1 Apr. 9, 2015

(51) Int. Cl.
*H01M 4/587* (2010.01)
*H01M 4/46* (2006.01)
*H01M 4/02* (2006.01)

(52) U.S. Cl.
CPC .............. *H01M 4/587* (2013.01); *H01M 4/466* (2013.01); *H01M 2004/028* (2013.01)

(58) Field of Classification Search
CPC ....... H01M 4/466; H01M 4/96; H01M 4/587; H01M 2004/028
See application file for complete search history.

(56) References Cited

U.S. PATENT DOCUMENTS

| 4,414,092 | A  | * | 11/1983 | Lu et al. ...................... 204/294 |
| 6,869,730 | B2 |   | 3/2005  | Matsubara et al. |
| 7,994,422 | B2 |   | 8/2011  | Jin et al. |
| 2005/0008560 | A1 | * | 1/2005 | Kataoka et al. ........... 423/445 R |
| 2010/0086823 | A1 | * | 4/2010 | Koshino et al. ................. 429/30 |
| 2011/0005598 | A1 |   | 1/2011 | Uetani |
| 2011/0091775 | A1 |   | 4/2011 | Lee et al. |
| 2011/0212363 | A1 | * | 9/2011 | Yamazaki et al. ............ 429/206 |
| 2012/0295166 | A1 |   | 11/2012 | Gennett et al. |
| 2013/0034780 | A1 |   | 2/2013 | Muldoon et al. |
| 2013/0252112 | A1 | * | 9/2013 | Doe et al. ...................... 429/328 |
| 2013/0260225 | A1 | * | 10/2013 | Doe et al. ...................... 429/188 |
| 2013/0302697 | A1 | * | 11/2013 | Wang et al. ................... 429/300 |
| 2013/0334780 | A1 | * | 12/2013 | Eberlein ................... 280/33.998 |

FOREIGN PATENT DOCUMENTS

| CN | 101414678 B | 6/2011 |
| JP | 09045312 | 2/1997 |
| JP | 09283173 | 10/1997 |
| JP | 3475652 | 12/2003 |

OTHER PUBLICATIONS

Pontiroli, et al., "Ionic Conductivity in the Mg Intercalated Fullerene Polymer $Mg_2 G_{60}$" Carbon 51 (2013) (p. 143-147).

(Continued)

*Primary Examiner* — Stewart Fraser
(74) *Attorney, Agent, or Firm* — Oblon, McClelland, Maier & Neustadt, L.L.P.

(57) ABSTRACT

A magnesium electrochemical cell having a positive electrode containing a carbon cluster compound as an active material is provided. In a preferred embodiment the carbon cluster material is a comminuted fullerene.

18 Claims, 10 Drawing Sheets

(56) References Cited

OTHER PUBLICATIONS

Even, et al., "Calculated Electronic Behavior and Spectrum of $Mg_+@C_{60}$ Using a Simple Jellium-shell Model" Int. J. Mol. Sci., (2004), 5, (p. 333-346).

Heguri, et al., "Magnetic Susceptibility of Magnesium Fulleride $Mg_4C_{60}$" Chemical Physics Letters, 490 (2010) (p. 34-37).
Borondics, et al., "Polymeric Sheets in $Mg_4C_{60}$" Solid State Communications 127 (2003) (p. 311-313).
International Search Report and Written Opinion issued Dec. 18, 2014 in PCT/US14/55861.

\* cited by examiner

FULLERENES AS HIGH CAPACITY CATHODE MATERIALS FOR A RECHARGEABLE MAGNESIUM BATTERY

BACKGROUND OF THE INVENTION

The present invention is directed to a positive electrode active material for a magnesium electrochemical cell and a magnesium secondary battery with a cathode based on the active material.

Lithium ion batteries have been in commercial use since 1991 and have been conventionally used as power sources for portable electronic devices. The technology associated with the construction and composition of the lithium ion battery (LIB) has been the subject of investigation and improvement and has matured to an extent where a state of art LIB battery is reported to have up to 700 Wh/L of energy density. However, even the most advanced LIB technology is not considered to be viable as a power source capable to meet the demands for a commercial electric vehicle (EV) in the future. For example, for a 300 mile range EV to have a power train equivalent to current conventional internal combustion engine vehicles, an EV battery pack having an energy density of approximately 2000 Wh/L is required. As this energy density is close to the theoretical limit of a lithium ion active material, technologies which can offer battery systems of higher energy density are under investigation.

Magnesium as a multivalent ion is an attractive alternate electrode material to lithium, which can potentially provide very high volumetric energy density. It has a highly negative standard potential of −2.375V vs. RHE, a low equivalent weight of 12.15 g/eq and a high melting point of 649° C. Compared to lithium, it is easy to handle, machine and dispose. Because of its greater relative abundance, it is lower in cost as a raw material than lithium and magnesium compounds are generally of lower toxicity than lithium compounds. All of these properties coupled with magnesium's reduced sensitivity to air and moisture compared to lithium, combine to make magnesium an attractive alternative to lithium as an anode material.

Production of a battery having an anode based on magnesium, requires a cathode which can reversibly adsorb and desorb magnesium ions and an electrolyte system which will efficiently transport magnesium ions. Significant effort in each of these areas is ongoing in many research organizations throughout the world and active materials under investigation include sulfur in various forms, including elemental sulfur, materials known as Chevrel compounds of formula $Mg_xMo_6T_n$, (wherein x is a number from 0 to 4, T is sulfur, selenium or tellurium, and n is 8) and various metal oxides such as $MnO_2$ (alpha manganese dioxide stabilized by potassium), $V_2O_5$ and ion stabilized oxides or hollandiates of manganese, titanium or vanadium.

Carbon based materials have been extensively investigated as electrode materials in Li-ion batteries. Such materials offer the advantage of being abundant and environmentally friendly. However, the application of carbon as an active magnesium intercalation material in rechargeable magnesium batteries has not been reported. General carbon phases, such as graphite and hard carbon, are electrochemically inert with respect to magnesium. The inventors believe these materials cannot efficiently delocalize the charges from divalent $Mg^{2+}$. Chevrel phase materials which are the only reported magnesium intercalation materials are believed to function because the $Mo_6$ atomic cluster in the crystal structure can attain the electroneutrality from the intercalation of $Mg^{2+}$. However, batteries having cathodes based on chevrel materials reported to date have low capacity and low working potential.

The inventors have therefore investigated carbon materials which are arranged in atomic clusters as possible intercalation materials. Utility of such materials as magnesium intercalants for cathodes in a magnesium battery has not been reported to date.

Pontiroli et al. (CARBON 51 (2013) 143-147) describe formation of a two dimensional fullerene polymeric network with Mg intercalated according to the formula: $Mg_2C_{60}$. Conductivity of the system is described as showing that Mg ions diffuse through the fullerene lattice.

Even et al. (Int. J. Mol. Sci., 2004, 5,333-346) describes performance of mathematical modelling calculations of electron energy levels based on $Mg^+$ ion in a fullerene model identified as a "jellium-shell."

Heguri et al. (Chemical Physical Letters, 490 (2010) 34-37) describes preparation and characterization of $C_{60}$ films containing varying controlled amount of diffused Mg. The films are semiconducting or insulating and not superconducting as in the case of $Ca_5C_{60}$, $Sr_4C_{60}$, and $Ba_4C_{60}$.

Borondics et al. (Solid State Communications, 127 (2003) 311-313) describes the solid state synthesis of $Mg_4C_{60}$ and characterization of the product by X-ray powder diffraction and Raman spectroscopy.

Jin et al. (U.S. Pat. No. 7,994,422) describes a particulate structure, comprising: a metal oxide semiconductor particle comprising a pore; a catalytic metal particle arranged within the pore of the porous metal oxide semiconductor particle, a size of the catalytic metal particle being 5 nm to 100 nm; and a carbon nanotube arranged within the pore of the metal oxide semiconductor particle, wherein the carbon nanotube is grown based on the catalytic metal particle arranged within the pore of the porous metal oxide semiconductor particle.

Matsubara et al. (U.S. Pat. No. 6,869,730) describes a binder system for a positive electrode of a lithium secondary battery. Fullerene is included in a list of possible active materials which can absorb and desorb lithium ions.

Uetani (US 2011/0005598) describes an organic photoelectric conversion element that has an anode and a cathode, an active layer arranged between the anode and the cathode and containing an electron accepting compound and an electron donating compound, and a functional layer arranged between the anode and the active layer so as to be adjacent to the anode, wherein the electron accepting compound is a fullerene derivative.

Lee et al. (US 2011/0091775) describes a lithium secondary battery having a negative electrode obtained by coating an aqueous mixture, including negative electrode active materials, a water-dispersible binder, and a conduction agent, on a current collector and then drying to remove the water. The negative electrode active materials can include carbon and graphite materials, such as natural graphite, artificial graphite, expanded graphite, carbon fiber, non-graphitizing carbon, carbon black, carbon nanotubes, fullerenes, and activated carbon; metal, such as Al, Si, Sn, Ag, Bi, Mg, Zn, In, Ge, Pb, Pd, Pt, or Ti which can be alloyed with lithium, and a compound containing the elements; a complex of metal and a compound thereof and carbon and graphite materials; and nitrides containing lithium.

Gennett et al. (US 2012/0295166) describes an organic radical battery (ORB) which is defined as a hybrid solid-state electrochemical device such as an energy storage/discharge device (e.g., a lithium-ion battery or the like) or an electrochromic device (e.g., smart window). The device may include an anode composed of a pre-lithiated nanostructured material, a cathode composed of a stable polymeric organic radical-based material, an electrolyte composed of a high performance solidstate polymer; and optional anode and cathode current collectors. Lithium and magnesium based anodes are described. The magnesium anodes include magnesium-doped carbon that may be further doped with boron. The anode may exist in a nanostructured form such as a nanostructured inorganic radical based on nanostructured carbon. The anode may be made of a heterogeneous carbon-based anode material and may be doped or undoped nanotubes (e.g., single walled nanotubes (SWNTs), double-wall nanotubes, multi-wall nanotubes, fullerenes, microbeads such as mesocarbon microbeads. The anode may be composed of carbon nanotubes (such as single-wall, double-wall, and/or multi-wall nanotubes), carbon fibers, fullerenes, graphene, and/or any carbon based nanostructured material, including doped carbon nanostructures, e.g., boron or nitrogen-doped nanotubes and/or BCN nanostructures (e.g., any hybrid nanotubes constructed of boron (B), carbon (C), and/or nitrogen (N) elements or other nanostructures of the so-called BCN material system).

Zhuo et al. (CN101414678B) describes a cathode material for a lithium ion battery which is formed by ball milling a metal with a carbonaceous material and then reducing the metal with hydrogen to form the metal hydride. The carbonaceous material is indicated to be graphite.

Yoshiaki et al. (JP09045312) describes a nonaqueous lithium secondary battery having a negative electrode constructed of carbon nanotube based based on a fullerene derivative. At least one of Li, Na, K, Mg and Ca is contained in the electrode tube. A conventional cathode capable of storing and releasing lithium ions is employed.

Tori et al. (JP09283173) describes a battery composed of a negative electrode based on a fullerene compound and a reduced metal. A metal oxide is used as the positive electrode.

Yoshiaki et al. (JP3475652) describes an alkaline storage battery having a negative electrode based on a fulleride containing a metal and a nickel hydroxide containing both cobalt and zinc in the form of a hydroxide or oxide as the positive electrode.

The utility of carbon cluster materials such as fullerene as a magnesium intercalant material, cathodes constructed of such material and magnesium batteries containing such cathodes has not been disclosed in any of these references.

Therefore, an object of the present invention is to provide a cathode active material based on a carbon cluster composition which meets the requirements of a high energy magnesium battery and overcomes the deficiencies of the conventionally known intercalant materials.

Another object of the present invention is to provide a magnesium battery containing a cathode based on a carbon cluster composition which has significantly improved energy density and performance in comparison to known magnesium electrochemical devices.

SUMMARY OF THE INVENTION

These and other objects are addressed by the present invention, the first embodiment of which includes an electrochemical cell, comprising:
a negative electrode comprising Mg;
an electrolyte comprising a Mg salt; and
a positive electrode comprising a carbon-cluster compound; wherein the carbon cluster compound is capable of intercalation and release of magnesium ions.

In a second embodiment, the present invention provides magnesium battery comprising: an anode; a cathode containing a carbon cluster compound; and an electrolyte; wherein the carbon cluster compound is a fullerene.

In a third embodiment the present invention provides the magnesium battery according to the previous embodiments wherein the fullerene compound is a cage structure and in a further embodiment the cage structure is spherical.

In one particular embodiment the fullerene material is a C60 compound, a C70 compound or a mixture thereof.

In a further embodiment the present invention provides a magnesium battery according to any of the previous embodiments wherein the carbon cluster compound or the fullerene is comminuted.

In another embodiment, the present invention provides a magnesium battery according to any of the previous embodiments wherein the carbon cluster compound or the fullerene is mixed with a carbon compound such as carbon black or graphite and in a further variation of this embodiment the materials are co-comminuted in preparation of forming the cathode. Ball milling may be a method of comminuting the materials.

In a further special embodiment of the present invention, the cathode active material comprising fullerene may be pressed between two sheets of carbon paper to form a cathode.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DESCRIPTION OF THE PREFERRED EMBODIMENTS OF THE INVENTION

The present inventors are conducting a wide scale study and evaluation of materials which may function as cathode active materials for a magnesium secondary battery. The object of this study is to discover cathode active materials which are readily available, safe and comparatively easy to handle in a production environment and which provide a magnesium battery having high capacity and high working potential.

Throughout this description all ranges described include all values and sub-ranges therein, unless otherwise specified. Additionally, the indefinite article "a" or "an" carries the meaning of "one or more" throughout the description, unless otherwise specified.

The inventors have surprisingly discovered that carbon cluster compounds are capable of magnesium intercalation and release and that such compound when formulated into a cathode allows for the production of a magnesium battery having high capacity and working potential. Thus, in a first embodiment, the present invention provides an electrochemical cell, comprising: a negative electrode comprising Mg; an electrolyte comprising a Mg salt; and a positive electrode comprising a carbon-cluster compound capable of intercalation and release of magnesium ions.

In one embodiment the carbon cluster compound is a fullerene. Preferably the fullerene compound is a cage structure and in a further embodiment the cage structure is spherical. Materials comprising C60 or C70 or mixtures thereof are employed in one embodiment of the invention. Such materials are commercially available in differing grades of purity as well as mixtures of C60 and C70. In a preferred embodiment the inventors have surprisingly found that when the material is first comminuted such as by ball milling before constructed into a cathode, the discharge capacity of a magnesium battery containing the electrode may be significantly increased. Furthermore the redox potential of the resulting device is a flat plateau. Additionally, the inventors have surprisingly discovered that when the comminuted material is mixed with a non-cluster material such as graphite, carbon nanotubes or carbon black, the capacity of a magnesium battery containing the electrode may be further increased.

In one advantageous embodiment, the comminuted carbon cluster material may be pressed into carbon paper to form an electrode without the use of a binder or other material. This embodiment may provide the greatest active material density and thus a battery of greatest capacity.

In another highly advantageous embodiment, the comminuted carbon cluster material may be sandwiched between two carbon paper sheets and pressed to form a cathode structure. Such pressing may optionally include a binder.

In other embodiments, the cathode may be formed with a binder such as polytetrafluoroethylene.

To prepare the cathode the carbon cluster material is first comminuted, preferably by ball-milling. If a non-cluster carbon material is added, this material may be co-comminuted with the carbon cluster material. The milled product may then be mixed with a binder. The binder material is not particularly limited and any binder recognized by one of skill in the art as suitable may be employed. Suitable binders may include polyvinylidene fluoride (PVDF), polytetrafluoroethylene (PTFE), styrene butadiene rubber (SBR), and polyimide. Polytetrafluorethylene may be employed in one preferred embodiment.

The amount of binder and non-cluster carbon material in the cathode composition may be no greater than 50% by weight, preferably no greater than 30% by weight and more preferably, no greater than 10% by weight. In a highly preferred embodiment, no binder is added and the content of the non-cluster carbon material may be may be no greater than 50% by weight, preferably no greater than 30% by weight and more preferably, no greater than 10% by weight.

The anode of the magnesium battery may be any anode suitable for a magnesium battery, including an anode of magnesium metal or a composition containing magnesium metal. The anode active material may further include an electrically conductive material and a binder. Examples of electrically conducting materials include carbon particles, such as carbon black. Example binders include various polymers, such as PVDF, PTFE, SBR, and polyimide.

An electrolyte layer is disposed between the anode and cathode and may include a separator which helps maintain electrical isolation between the positive and negative electrodes. A separator may include fibers, particles, web, porous sheet, or other form of material configured to reduce the risk of physical contact and/or short circuit between the electrodes. The separator may be a unitary element, or may include a plurality of discrete spacer elements such as particles or fibers. The electrolyte layer may include a separator infused with an electrolyte solution. In some examples, for example using a polymer electrolyte, the separator may be omitted.

The electrolyte layer may include a non-aqueous solvent, such as an organic solvent, and a salt of the active ion, for example a magnesium salt. Magnesium ions provided by the magnesium salt interact electrolytically with the active material(s). An electrolyte may be an electrolyte including or otherwise providing magnesium ions, such as a non-aqueous or aprotic electrolyte including a magnesium salt. The electrolyte may include an organic solvent. Magnesium ions may be present as a salt or complex of magnesium, or as any appropriate form.

An electrolyte may include other compounds, for example additives to enhance ionic conductivity, and may in some examples include acidic or basic compounds as additives. An electrolyte may be a liquid, gel, or solid. An electrolyte may be a polymer electrolyte, for example including a plasticized polymer, and may have a polymer infused with or otherwise including magnesium ions. In some examples, an electrolyte may include a molten salt. In one aspect, the electrolyte may include an organo magnesium halide, including $Ph_2Mg$, and $PhMgCl^-AlCl_3$ (abbreviated as Mg-Phenyl) or magnesium bis(trifluoromethansulfonyl)imide (abbreviated as Mg-TFSI). In a preferred embodiment, the electrolyte may be Mg-Phenyl in THF.

The cathode active material and may be present as a sheet, ribbon, particles, or other physical form. An electrode containing the cathode active material may be supported by a current collector.

A current collector may include a metal or other electrically conducting sheet on which the electrode is supported. The current collector may be formed of carbon, carbon paper, carbon cloth or a metal or noble metal mesh or foil.

Figure 1:
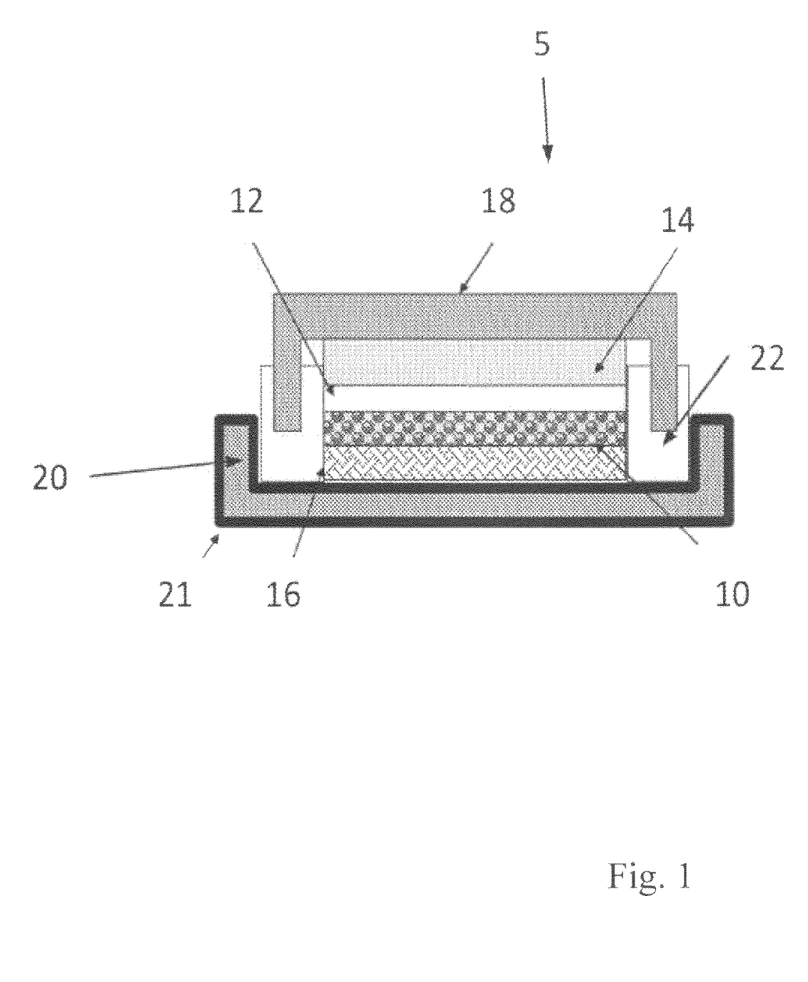
FIG. 1 is a schematic diagram of a magnesium battery according to one embodiment of the present invention.

FIG. 1 shows an example of one configuration of a rechargeable magnesium cell 5. The cell 5 includes a positive electrode 10 including the carbon cluster material according to the invention as the cathode active material, an electrolyte layer 12, a negative electrode 14, a cathode current collector 16, a negative electrode housing 18, a positive electrode housing 20 including an inert layer 21, and a sealing gasket 22. The electrolyte layer 12 may include a separator soaked in electrolyte solution, and the positive electrode 10 may be supported by the cathode current collector 16. In this example, the negative electrode 14 includes an active material of magnesium metal.

The ether solvent may be one or more of tetrahydrofuran, ethylene glycol dimethyl ether and bis 2-methoxy ethyl ether in consideration of utility in a battery, safety and ease of handling. Tetrahydrofuran may be most preferred, although battery construction and requirements may dictate the necessity for an ether with different physical properties.

Having generally described this invention, a further understanding can be obtained by reference to certain specific examples which are provided herein for purposes of illustration only and are not intended to be limiting unless otherwise specified.

EXAMPLES

Figure 2:
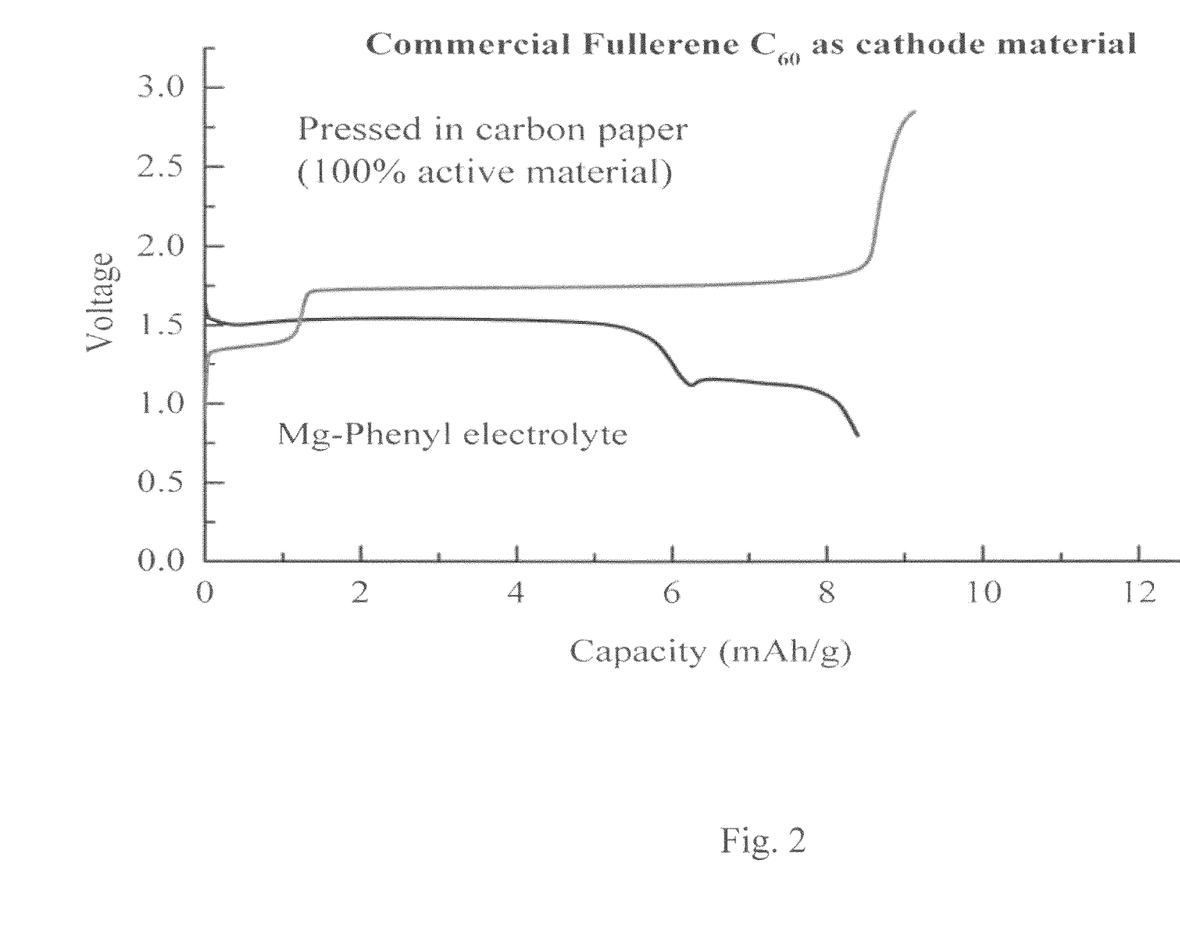
FIG. 2 shows the electrochemical performance of a cell prepared with commercially available $C_{60}$ as cathode active material as described in Example 1 of the invention.
Figure 7:
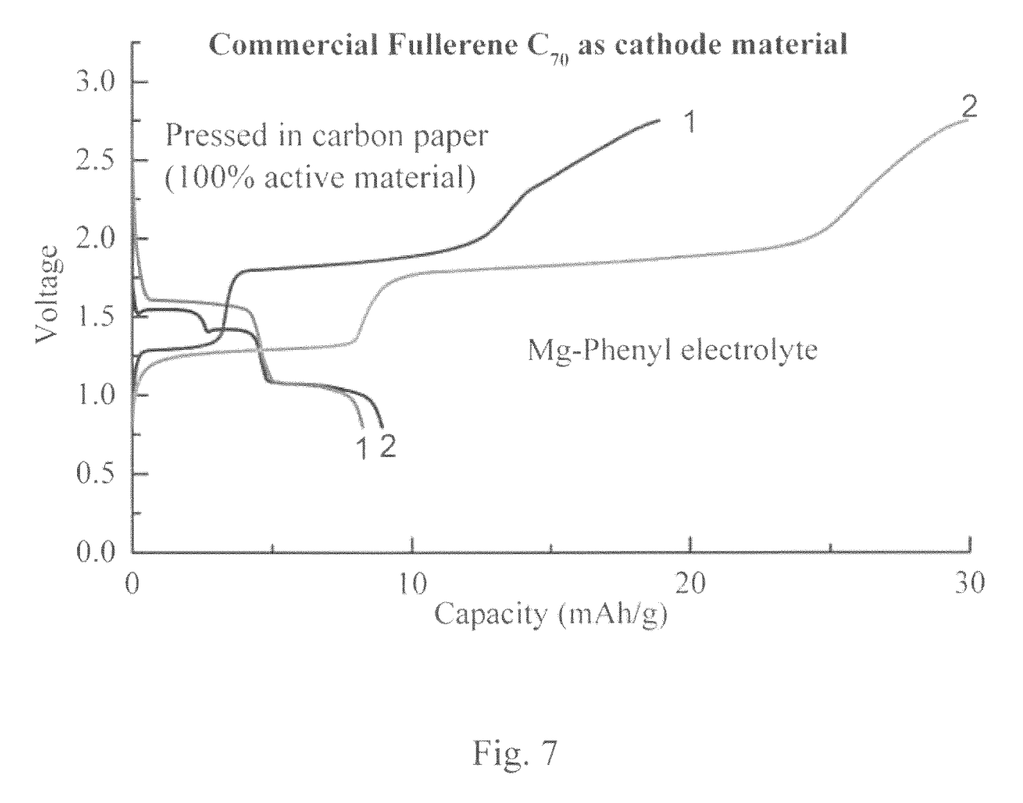
FIG. 7 shows the electrochemical performance of a cell prepared with commercially available $C_{70}$ as cathode active material as described in Example 1 of the invention.

1. Raw material fullerene C60 or C70 powder (10 mg, Sigma, ≥98%) was sandwiched in carbon paper (D=13 mm) and pressed to pellet under 10 tons pressure. Each electrode pellet was tested in a customized Tomcell (TJ-AC Tomcell, Japan) using a 0.2 μm thick (28 mm diameter) standard glass filter (Sigma-Aldrich) as a separator and a Mg foil (19 mm diameter) as the counter and reference electrodes. Mg foil was polished by scraping each side of the foil with sandpaper and wiping clean with a Kimwipe (Kimberly-Clark). One glassy carbon dish was used as a current collector at the cathode side. All cells were assembled under Ar in a glove box (<0.1 ppm of water and oxygen). The electrochemical test was performed in the voltage region between 0.8 and 2.75 V vs. Mg/Mg$^{2+}$ at a constant current of 25 μA using a Bio-Logic potentiostat/galvanostat VMP battery testing system. All of the batteries were kept in an oven at constant temperature (25±0.5° C.) during the test. The C60 pellet showed a discharge capacity at 10 mAh/g and two voltage plateaus at 1.5 V and 1.2 V as shown in FIG. 2. The result for C70 is shown in FIG. 7.

2. The materials for forming a mixture of fullerene and other carbon materials were as follows. Raw materials of 1.0 g of C60, 1.0 g carbon black (dried at 150° C. under vacuum overnight prior to using) and eight half inch and twenty quarter inch Zirconia balls were sealed into 65 ml Zirconia vial. The mechanical milling was performed for a total of 6 hours with a Retsch PM100 ball milling machine. The electrochemical test for the C60/C composite as a cathode active material is shown in FIGS. 3 and 4.

3. C60/C pelletized electrodes were composed of 70 wt % as-prepared material, 20 wt % carbon black and 10 wt % Polytetrafluoroethylene (PTFE, Daikin). The mixture was ground using a mortar and pestle with the addition of 5 ml ethanol. After 30 minutes of grinding, the mixture became a soft block and was pressed into a 120 μm sheet via a press roller. The C60/C PTFE sheet was dried at 120° C. under vacuum overnight. C60/C pellets were cut out from the sheet with 13 mm diameter (1.33 cm$^2$ area). The electrochemical result for C60/C is shown in FIGS. 5 and 6.

4. The electrodes of comparative samples of carbon black, graphite and carbon nanotube were prepared as follows. 0.9 g carbon black (or graphite, or carbon nanotube) was manually grinded with 0.1 g PTFE with the addition of 5 ml ethanol. After 30 minutes of grinding, the mixture became a soft block and was pressed into a 120 μm sheet via a press roller. The PTFE sheet was dried at 120° C. under vacuum overnight. The obtained pelletspellets were cut out from the sheet with 13 mm diameter (1.33 cm$^2$ area). The electrochemical results obtained for carbon black, graphite and carbon nanotube are shown in FIGS. 8, 9 and 10, respectively.

Figure 3:
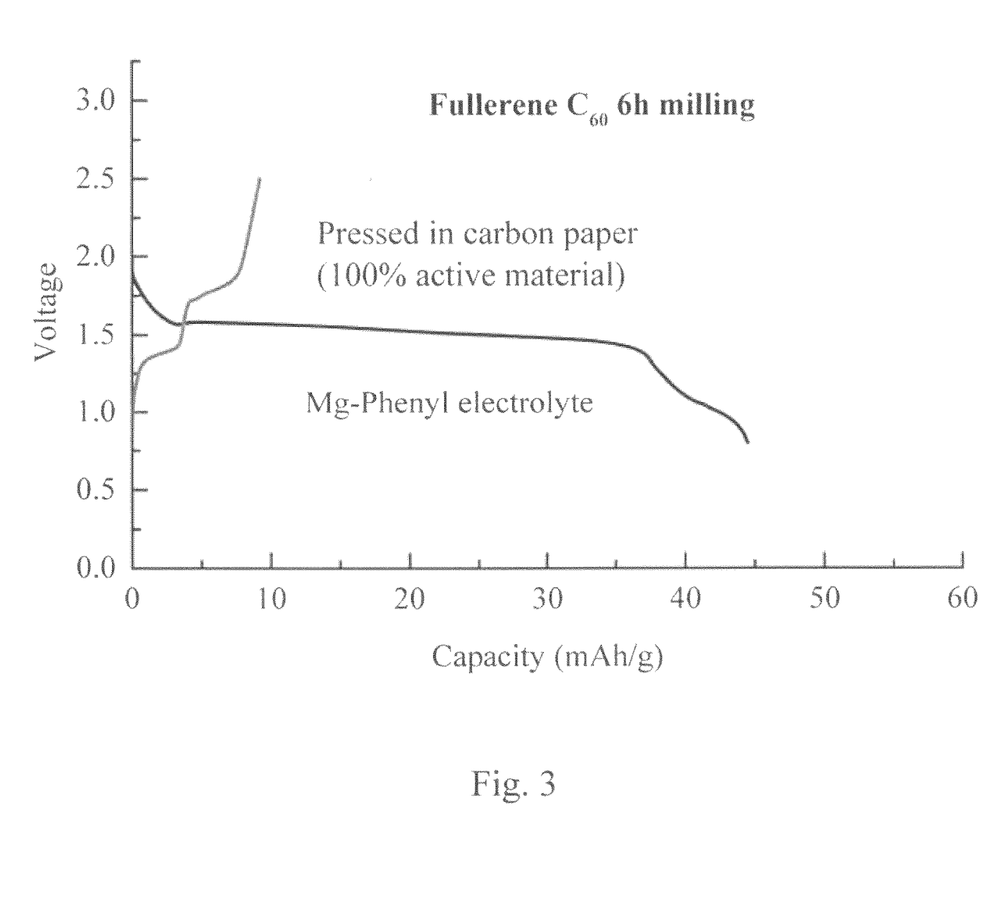
FIG. 3 shows the electrochemical performance of a cell prepared with comminuted $C_{60}$ as cathode active material as described in Example 2 of the invention.
Figure 4:
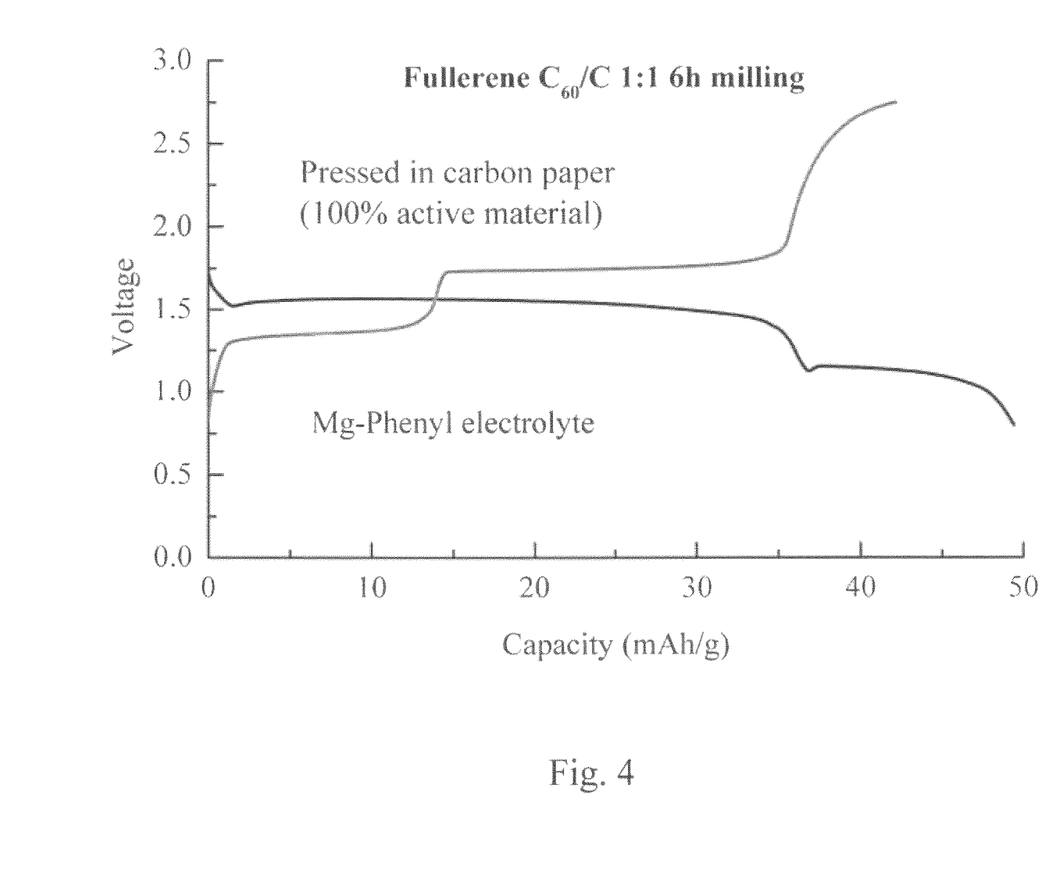
FIG. 4 shows the electrochemical performance of a cell prepared with comminuted 1/1 $C_{60}$/C composite as cathode active material as described in Example 2 of the invention.
Figure 5:
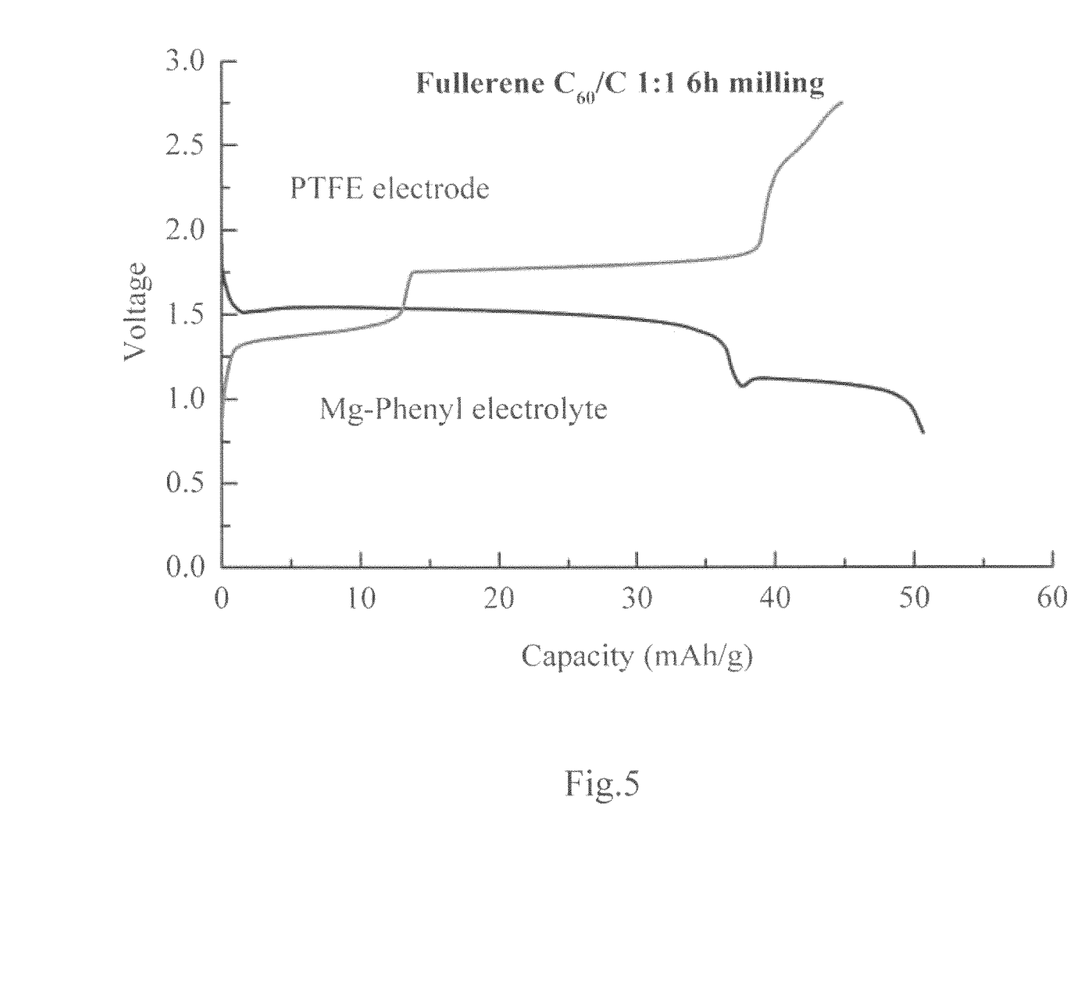
FIG. 5 shows the electrochemical performance of a cell prepared with comminuted 1/1 $C_{60}$/C composite as cathode active material as described in Example 3 of the invention.
Figure 6:
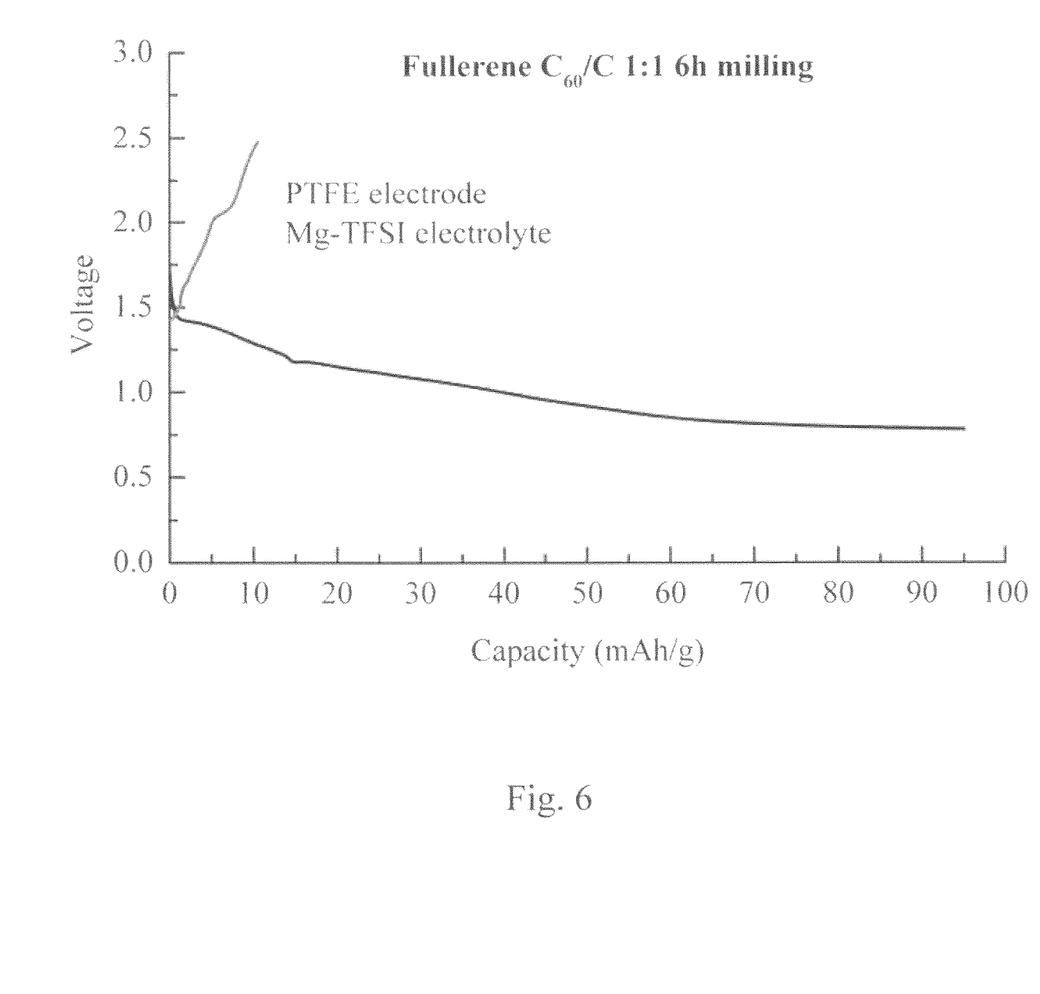
FIG. 6 shows the electrochemical performance of a cell prepared with comminuted 1/1 $C_{60}$/C composite as cathode active material as described in Example 3 of the invention.
Figure 8:
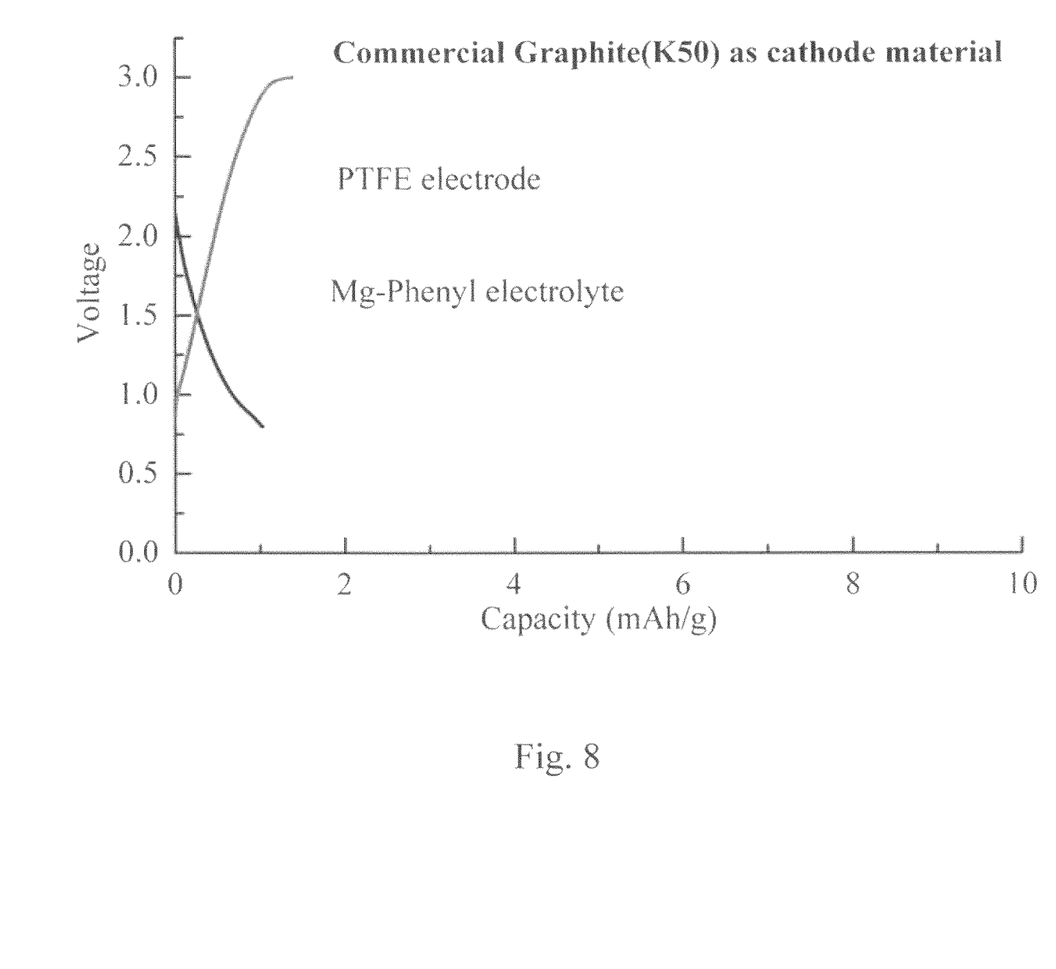
FIG. 8 shows the electrochemical performance of a cell prepared with commercially available graphite as cathode active material as described in Example 4 of the invention.
Figure 9:
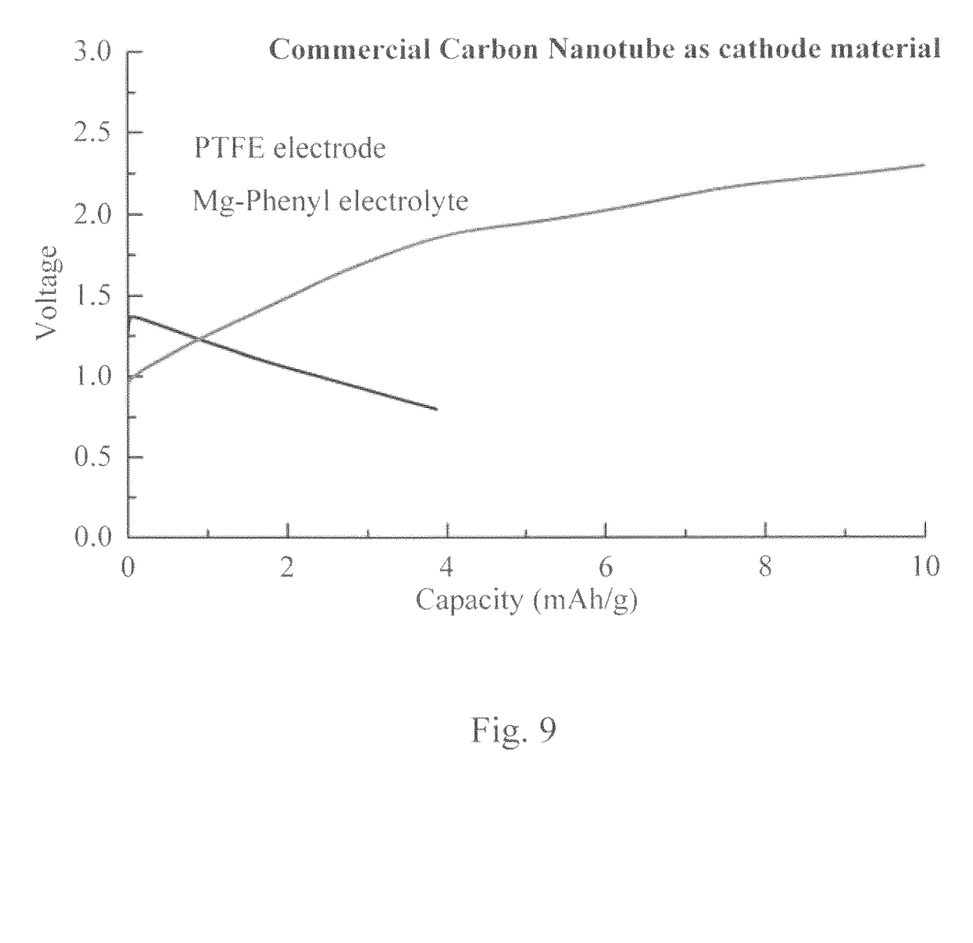
FIG. 9 shows the electrochemical performance of a cell prepared with commercially available carbon nanotubes as cathode active material as described in Example 4 of the invention.
Figure 10:
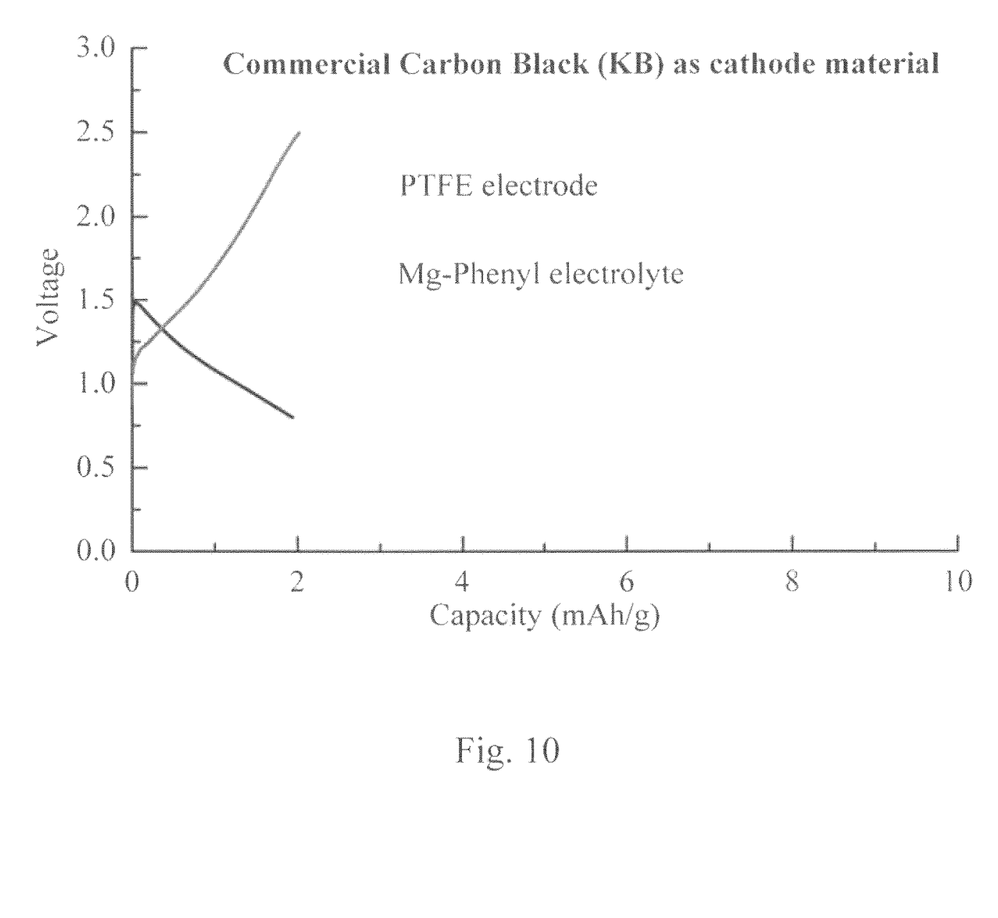
FIG. 10 shows the electrochemical performance of a cell prepared with commercially available carbon black as cathode active material as described in Example 4 of the invention.

|  | Voltage (V) | Capacity (mAh/g) | | | |
| --- | --- | --- | --- | --- | --- |
|  |  | Discharge | Charge | Electrolyte | FIG. |
| Example |  |  |  |  |  |
| C60 (commericial, 100% pressed in carbon paper) | 1.5 & 1.2 | 10 | 10 | Mg-Phenyl | FIG. 2 |
| C60 ball milled (100% pressed in carbon paper) | 1.5 & 1.2 | 45 | 10 | Mg-Phenyl | FIG. 3 |
| C60/C ball milled (100% pressed in carbon paper) | 1.5 & 1.2 | 50 | 43 | Mg-Phenyl | FIG. 4 |
| C60/C ball milled (PTFE electrode, milled product:KB:PTFE = 70:20:10) | 1.5 & 1.2 | 51 | 45 | Mg-Phenyl | FIG. 5 |
| C60/C ball milled (PTFE electrode, milled product:KB:PTFE = 70:20:10) | Slop profile, No clear plateau | 95 | 12 | Mg-TFSI | FIG. 6 |
| C70 (commericial, 100% pressed in carbon paper) | 1.5 & 1.2 | 10 | 20 | Mg-Phenyl | FIG. 7 |
| Comparative |  |  |  |  |  |
| Graphite (PTFE electrode, graphite:PTFE = 0.9:0.1) | Slop profile, No clear plateau | 2 | 2 | Mg-Phenyl | FIG. 8 |
| Carbon Nanotube (PTFE electrode, carbon nanotube:PTFE = 0.9:0.1) | Slop profile No clear plateau | 4 | 10 | Mg-Phenyl | FIG. 9 |
| Carbon Black (PTFE electrode, carbon black:PTFE = 0.9:0.1) | Slop profile, No clear plateau | 2 | 2 | Mg-Phenyl | FIG. 10 |

The invention claimed is:

1. An electrochemical cell, comprising:
a negative electrode comprising Mg;
an electrolyte comprising a Mg salt; and
a positive electrode having an active material comprising a dried co-comminuted mixture of a carbon-cluster compound and a non-cluster carbon material capable of intercalation and release of magnesium ions;
wherein a content of the carbon-cluster compound is at least 50% by weight of the active material.

2. The electrochemical cell according to claim 1, wherein the carbon-cluster compound is a fullerene compound.

3. The electrochemical cell according to claim 2, wherein the fullerene compound comprises a cage structure.

4. The electrochemical cell according to claim 3, wherein the cage structure of the fullerene compound is spherical.

5. The electrochemical cell according to claim 2, wherein the fullerene is C60, C70 or a combination thereof.

6. The electrochemical cell according to claim 1, wherein the non-cluster carbon material is at least one of carbon black and graphite.

7. The electrochemical cell according to claim 1, wherein the dried co-comminuted mixture of a carbon-cluster compound and a non-cluster carbon material is obtained from a ball-milling operation.

8. The electrochemical cell according to claim 1, wherein the Mg salt comprises a compound selected from the group consisting of an organo magnesium halide.

9. The electrochemical cell of claim 1, wherein the active material further comprises a binder.

10. An electrochemical cell, comprising:
a negative electrode comprising Mg;
an electrolyte comprising a Mg salt; and
a positive electrode comprising a sandwich structure of a dried comminuted carbon-cluster compound capable of intercalation and release of magnesium ions pressed between two sheets of carbon paper.

11. The electrochemical cell according to claim 10, wherein the comminuted carbon-cluster compound is a fullerene compound.

12. The electrochemical cell according to claim 10, wherein the comminuted carbon-cluster compound further comprises a comminuted non-carbon-cluster compound.

13. The electrochemical cell according to claim 12, wherein the carbon-cluster compound and the non-carbon-cluster compound are co-comminuted prior to pressing between the two sheets of carbon paper.

14. The electrochemical cell of claim 12, wherein the comminuted non-carbon-cluster compound is at least one of graphite and carbon black.

15. A cathode for a magnesium electrochemical cell, comprising a dried comminuted carbon cluster compound capable of intercalation and release of magnesium ions sandwiched between two carbon paper sheets.

16. The cathode for a magnesium cell according to claim 15, wherein the carbon cluster compound comprises a fullerene compound.

17. The cathode for a magnesium cell according to claim 16, wherein the dried comminuted fullerene compound comprises at least one of $C_{60}$ and $C_{70}$.

18. The cathode for a magnesium cell according to claim 15, wherein the comminuted carbon-cluster compound further comprises a comminuted non-carbon-cluster compound.

* * * * *